(12) United States Patent
Sun et al.

(10) Patent No.: US 7,924,735 B2
(45) Date of Patent: Apr. 12, 2011

(54) VIRTUAL GRID

(75) Inventors: Peng Sun, Singapore (SG); Lek Heng Ngoh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 229 days.

(21) Appl. No.: 11/920,735

(22) PCT Filed: May 20, 2005

(86) PCT No.: PCT/SG2005/000156
§ 371 (c)(1),
(2), (4) Date: May 12, 2009

(87) PCT Pub. No.: WO2006/123999
PCT Pub. Date: Nov. 23, 2006

(65) Prior Publication Data
US 2009/0285136 A1    Nov. 19, 2009

(51) Int. Cl.
*G01R 31/08* (2006.01)
*G06F 11/00* (2006.01)
*H04L 12/28* (2006.01)
*H04L 12/50* (2006.01)
*H04Q 11/00* (2006.01)

(52) U.S. Cl. .................. 370/252; 370/254; 370/386

(58) Field of Classification Search .................. None
See application file for complete search history.

(56) References Cited

U.S. PATENT DOCUMENTS

| 6,816,862 B2 | 11/2004 | Mulgund et al. |
| 2003/0154262 A1 | 8/2003 | Kaiser et al. |
| 2003/0202479 A1 | 10/2003 | Huang et al. |
| 2004/0151130 A1* | 8/2004 | Beshai et al. ............. 370/254 |

FOREIGN PATENT DOCUMENTS

| WO | WO 01/26328 A2 | 4/2001 |
| WO | WO 02/087172 A1 | 10/2002 |

* cited by examiner

*Primary Examiner* — Chirag G Shah
*Assistant Examiner* — Ashley L Shivers
(74) *Attorney, Agent, or Firm* — Jacobson Holman PLLC

(57) ABSTRACT

A method for constructing a virtual grid (10) for routing data via wireless sensor nodes (20) of a sensor field (30), the method comprising: flooding the sensor field (30) to identify a first terminator ($V_1$), the flooding originating from a first node ($V_0$); flooding the sensor field (30) to identify a second terminator ($V_2$), the flooding originating from the first terminator ($V_1$); and forming a main communication path (40) by selecting nodes between the first and second terminators ($V_1$, $V_2$); wherein the virtual grid (10) is constructed by flooding the sensor field (30) such that each node in the sensor field (30) is assigned a row identifier relative to the main communication path (40), the flooding originating from the nodes belonging to the main communication path (40); and wherein each node is assigned a column identifier according to its hop count from the first terminator ($V_1$).

20 Claims, 9 Drawing Sheets

VIRTUAL GRID

This is a national stage of International Application No. PCT/SG2005/000156 filed on May 20, 2005 and published in English.

TECHNICAL FIELD

The invention concerns a virtual grid for routing data via wireless sensor nodes of a sensor field.

BACKGROUND OF THE INVENTION

Recent advances in Very Large Scale Integration (VLSI) circuits, microprocessors and wireless communication technologies have enabled the deployment of large scale sensor networks. In these networks, thousands of tiny sensors are distributed over a vast field to obtain fine-grained, high-precision sensing data. These sensors are typically powered by limited energy resources and communicate wirelessly.

In a typical scenario, several thousand sensors are rapidly deployed, for example, from an aircraft, in remote terrain. The sensors coordinate with each other to establish a communication network, and divide the task of mapping and monitoring the terrain amongst themselves in an energy-efficient manner. They further adapt their overall sensing to the remaining total resources, and re-organize upon sensor failure. Similarly, when additional sensors are added later, the sensors are able to reorganize themselves to take advantage of the additional sensors.

Sensors deployed to a certain region collaboratively work toward specific tasks, for example, habitat monitoring, environmental surveillance, battle field detection, and vehicle tracking. Generally, sensor network applications gather data from sources and process the gathered data. Processing is centralized or distributed. Both approaches require data dissemination. Data dissemination occurs between sources and sinks. Sources detect certain events or collect certain data. Sinks are interested in the detected events or collected data.

Frequently, sensor nodes perform local data processing such as counting, filtering, and aggregation. These operations simplify the data processing at the central data-collection point. It is radically different from conventional data networks, in which the networking layer does not understand (or care) the data content, in wireless sensor networks, the node needs to understand the data content (e.g. by communications between networking layer and application layer), so as to offload the central data processing point and optimize the use of limited resource such as battery life.

Main stream ad hoc routing protocols and Internet-based protocols are not feasible for a sensor network. First of all, they are address based. Address based routing emphasize source and destination, which is often end-to-end based. However, in sensor networks, data sinks care about data more than the destination address. In most cases, sinks do not know the destination address of a source, because any source in the target region may report an event detection. Secondly, address based routing requires a global unique address in the sensor field. Thirdly, a high density of sensors implies lengthy bits for an address field incurring a high communication overhead. Communication and energy cost is a dominant factor in sensor networks. Long address bits are inefficient for data transmission. In a typical sensor network, most sensors are expected to sleep or be inactive until they detect a certain event or receive a command to wake up. They do not require lengthy addressing bits as long as the nodes in the communication path can differentiate each other apart.

Schemes targeting data oriented network are typically termed as data dissemination. Data dissemination is required due to the resource challenges introduced by sensor networks. A few data dissemination schemes have been proposed such as SPIN, LEACH and Directed Diffusion.

Without any priori knowledge on the deployment of the sensor nodes, one assumes a flat structure of the sensor field, such as directed diffusion and SPIN. However, this may lead to inefficient use of resources, since every command must involve a full scale flooding in the sensor field. Without a structure, there is no way to define 'regions' or 'interested areas' for resource optimization purposes.

Sensor node level information including information relating to physical positioning and geographical coordinates, is often assumed by many proposed solutions of data routing and data processing in wireless sensor networks. The assumption is flawed when considering ad-hoc deployments of a large number of tiny sensors. GPS only provides coordinates to sensor nodes in a horizontal plane. For a vertical plane, such as building health monitoring, GPS coordinates do not help because some nodes have identical GPS coordinates. Also, GPS receivers are relatively expensive and are not feasible for tiny sensor nodes.

There is a desire to provide a holistic approach to route data within a sensor network using a structure which is able to optimize energy consumption. It is even more desirable that the structure assumes no geographical location information or any application specific information.

SUMMARY OF THE INVENTION

In a first preferred aspect, there is provided a method for constructing a virtual grid for routing data via wireless sensor nodes of a sensor field, the method comprising:

flooding the sensor field to identify a first terminator, the flooding originating from a first node;

flooding the sensor field to identify a second terminator, the flooding originating from the first terminator; and forming a main communication path by selecting nodes between the first and second terminators;

wherein the virtual grid is constructed by flooding the sensor field such that each node in the sensor field is assigned a row identifier relative to the main communication path, the flooding originating from the nodes belonging to the main communication path; and wherein each node is assigned a column identifier according to its hop count from the first terminator.

The first node may be selected by a user.

The columns of the virtual grid may be constructed when identifying the second terminator.

A relationship between a node and a neighboring node may be classified according to the order in which they receive a broadcast message of the flooding. The relationship may be classified according to any one in the group consisting of: only one preferred parent, normal parents, children, sibling, and unknown.

A flooding packet may be transmitted to the nodes during flooding. The flooding packet may have a data structure comprising variables to store information relating to: phase number, thickness control of the rows and columns, hop count from the originating node, granularity of each row or column and total number of nodes in the sensor field.

The topology of the sensor field may be stored in a local topology database of each node.

The first terminator may be a node having the largest hop count from the first node after flooding by the first node and is a node without any children. The second terminator may be a node having the largest hop count from the first terminator after flooding by the first terminator and is a node without any children.

The method may further comprise thickening the main communication path by increasing the number of neighboring nodes proximal to the main communication path.

Flooding may be restricted to a portion of the total number of nodes of the sensor field.

Communication between a source and a sink via the virtual grid may be routed according to logical directions. Advantageously, communication paths between a source and sink do not need to be recorded and thus saves storage, bandwidth and energy resources in a node.

The first node may belong to the main communication path.

All nodes of the sensor field may belong to the main communication path.

Each node may have the same range of wireless coverage.

Each node may asymmetrically communicate with another node.

The sensor field may be on a two dimensional plane or a multi-dimensional plane.

The main communication path may be substantially a straight line from the first terminator to the second terminator.

In a second aspect, there is provided a wireless sensor node for constructing a virtual grid for a plurality of wireless sensor nodes of a sensor field, the node comprising:

if the node is an originator, a transmission module to flood the sensor field to identify a first terminator;

if the node is the first terminator, a transmission module to flood the sensor field to identify a second terminator; and a decision making module to form a main communication path by selecting nodes between the first and second terminators;

wherein the virtual grid is constructed by flooding the sensor field such that each node in the sensor field is assigned virtual coordinates relative to the main communication path, the flooding originating from the nodes belonging to the main communication path.

The node may further comprise:

a pre-processing module to validate received packets from neighboring nodes; and a dispatch module to classify received packets into one of three categories: neighbor management, grid-construction, or pass-through.

In a third aspect, there is provided a method for communicating information between a source and a sink via wireless sensor nodes of a sensor field, the method comprising:

flooding an interest of the sink to nodes in the field in the same row as the sink;

flooding an alert from the source to nodes in the field in the same column as the source, the alert including an indication that an event has occurred or that data has been collected; and constructing a communication path between the source and the sink when the source and sink find each other.

The method may further comprise searching for a multihop path via a bridge across at least one column to match the source with the sink.

The method may further comprise flooding the interest from another sink until the flooding reaches a node already aware of the interest in order to scale down the extent of flooding.

In a fourth aspect, there is provided a virtual grid constructed by the method as described.

The present invention does not rely on GPS systems, location or any other application-specific information. No limitations are imposed on the deployment of sensor field. The virtual grid is also adjustable in terms of the thicknesses of row and columns, and thus different degree of robustness can be achieved. Logical directions such as up, down, left, right are defined based on neighborhood relationships.

The cost of constructing a virtual grid is minimal as it may be performed only once. The virtual grid benefits all subsequent data transmission in sensor network. The virtual grid provides structural information to application layer. This structural information leads to cross-layer energy-efficiency leading to a longer battery life span for the sensor network, especially if there is frequent data transmission between sources and sinks.

Grid construction is relatively fast and is scalable according to the total number of sensor nodes. The time to construct the virtual grid is considered negligible compared with the lifetime of the sensor network.

Advantageously, the present invention establishes a foundation for logical direction, logical relationships between nodes, and for designing and optimizing data dissemination protocols.

BRIEF DESCRIPTION OF THE DRAWINGS

An example of the invention will now be described with reference to the accompanying drawings, in which.

DETAILED DESCRIPTION OF THE DRAWINGS

Figure 1:
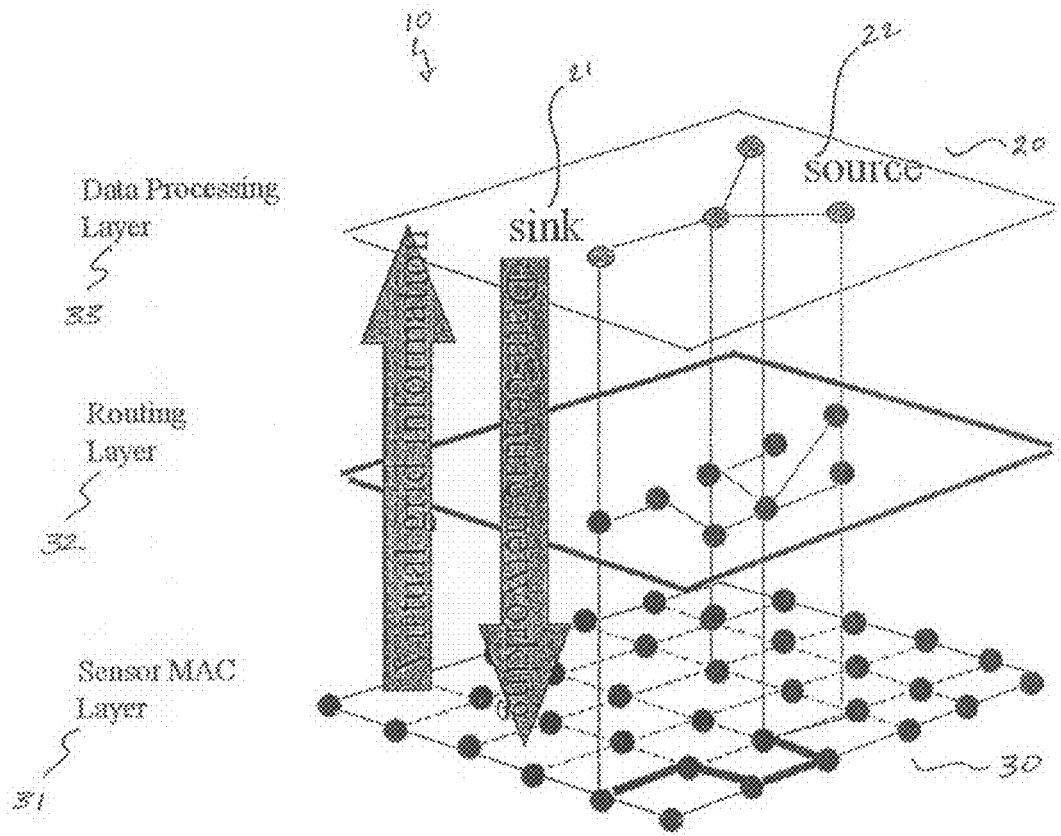
FIG. 1 is a diagram illustrating cross-layer optimization using a virtual grid.

Referring to FIG. 1, a virtual grid 10 for routing data via wireless sensor nodes 20 of a sensor field 30 is provided. The virtual grid 10 is a part of a systematic approach towards energy-optimized data centric routing and processing in wireless sensor networks 30. It differs from a traditional layered approach as it encourages the exchange of information between different layers. A virtual grid 10 uses cross-layer interaction to achieve optimized data transportation. This interaction is useful with small resource-constrained sensors in wireless networks. Cross-layer optimization can compress the protocol stack, since duplicated information (or different information for the same purpose) can be omitted. The existing OSI model seven-layer approach duplicates a lot of information in each layer, for example, identifying a node. In addition, a cross-layer approach has many other desirable visible benefits after systematic analysis is conducted.

The virtual grid 10 is suitable for cross-layer optimization. In terms of the OSI model, the virtual grid 10 is located above the data link layer (layer 2) and below the routing layer 32. The routing layer 32 is above the MAC layer 33. Virtual grid 10 construction explores the specific relationship between broadcasting and the logical distance among sensor nodes. After construction of the virtual grid 10, its topology information is exposed to upper layers including the routing layer 32 and data processing layer 33. Using topology information, data processing is optimized and made meaningful and effective to the physical network. The decisions made by the data processing layer 33 are passed down through the routing layer 32 to the MAC layer 33. The MAC layer 33 fulfils the routing request based on the topology information and the specific neighborhood relationships established by the virtual grid 10.

The virtual grid 10 is able to be constructed above connected sensor networks 30 with arbitrary shapes for the coverage region. A connected sensor network implies that for each pair of nodes in the sensor network 30, there is at least one communication path available. The communication path may be a single hop or multi-hop. In one embodiment, the virtual grid 10 requires every sensor 20 to have the same transmission range. The wireless communication range is dependent on the physical environment. For example, the transmission range of a wireless node 20 in a blocked-environment can be very different from that of free-space. A virtual grid 10 does not require identical transmission ranges. In one embodiment, it only requires the sensors 20 to be equipped with an identical wireless transmission component or identical technical specifications. In one embodiment, a virtual grid 10 assumes the sensor network is deployed on a 2D plane.

Neighborhood Relationships

The neighborhood relationship is used in constructing a virtual grid 10 construction. The relative location of neighboring nodes is used to establish a self-organized sensor network. The neighborhood information implies many factors, such as the distance between sources 22 and sinks 21. Neighborhood relationship also forms the foundation for a multi-hop routing path.

Typically, sensor nodes sleep most of the time and thus do not transmit or receive packets. Sensor nodes are only active when interesting events occur. Sleeping is necessary to conserve energy usage.

A virtual grid 10 adopts a construct-and-maintain approach. During construction of the virtual grid 10, each sensor node establishes their neighborhood relationship at that point in time. During construction, all sensors are required to be activated. After construction of the virtual grid 10, the sensors may be deactivated or enter sleeping mode. Inevitably, some sensor nodes may die. New sensors may be added, or some sensors may be moved to other locations. For example, environmental surveillance sensors in the ocean may drift with the ocean current. The sensors use the grid information to build a routing path, and this process does not require every sensor to be constantly active all the time.

In a virtual grid 10, each sensor node has five possible types of neighbors, namely 1) only one preferred parents, 2) normal parents, 3) children, 4) sibling, 5) unknown: The relationships are formed via a flooding process. For different flooding processes, different neighboring relationships are formed. In total, there may be up to three different sets of neighboring relationships as a result of the three flooding processes.

Information Propagation Process

The foundation for constructing the virtual grid 10 is a special flooding process called the Information Propagation Process. This process is originated by one or more originator nodes simultaneously. Nodes involved in the flooding process receive the flooding packets at different times. Generally, the further a node is from the originator node geographically, the longer it waits to receive the flooding packets.

If the flooding process is initiated by multiple originator nodes, the multiple nodes must be formed in a line. Nodes which are closer to the originator node(s) receive the signal from the originator node(s) earlier than nodes further away.

During construction of the virtual grid 10, the flooding process is triggered either by a single node or multiple nodes along a line. Each originator node generates a packet with the following data structure:

```
Struct {
    int p; //phase number, differentiating different flooding
    int B; //thickness control. Controls the thickness of row and column
    int a; //value of hop count
    int b; // value of thickness of current row/column in question.
    int nn; // total number of nodes;
} flood;
```

In this data structure there are only five integers. The first integer is a phase number p. Constructing a virtual grid 10 generally comprises three flooding processes, which are segregated into three phases. The integer p is used to identify each process, that is, p=0, 1, 2. In a very resource-constrained environment, p only requires 2 bits. The second integer is a thickness control factor B. By default B=1 and must be larger than that. It is used to control the thickness of the rows and columns constructed by the virtual grid 10. The larger the B value is, the thicker the row/column is. The third value counts the hops of the current flooding process. The fourth value records the thickness of current row/column, when it reaches 0, it will restart from B. The third and forth integers are dynamic values, which may be changed by each hop of the flooding process. The initial value of a is 0 and b is B. The initial values are set by originator node(s), and are read/changed by a receiving node when it receives the packet. The last integer is an estimation of the total number of nodes. The total number of nodes does not have to be precise, because it is only used to determine the duration of one flooding process. To ensure propagation, the number of nodes must be larger than the actual number of nodes. The disadvantage of a overestimating the number of nodes above the actual number is that construction of the virtual grid 10 becomes slower than otherwise expected.

For a phase number p, each node creates two topology variables in a local information database. These variables are $a_p$ and $b_p$. Independent of the phase number p, each node has a variable c which is either 1 or −1. By default, each node sets their c variable to 1 unless they receive a packet instructing it to be changed.

The originator node(s) transmit the packet to all of its neighboring nodes either by broadcast or unicast. For a phase number p, the node processes the flooding packet when it does receive the flooding packet according to the following pseudo code:

```
On_Receive_Message (p, B, a, b, nn}
  1.     if (phase p is seen for the first time){
  2.         create a_p in the local topology database
  3.         create b_p in the local topology database
  4.         if (b equals to 0) {
  5.             assign b_p with B;
  6.             assign a_p with a + c;
  7.         else {
  8.             assign b_p with b − 1;
  9.             assign a_p with a;
  10.        }
```

-continued

```
11.        copy nn, B to the local topology database
12.        mark the sender as preferred-parent for phase p.
13.        send (p, B, a_p, b_p, nn) to all neighbors
14.    } else {
15.        if {a_p equals to a – 1} {
16.            mark the sender as child-node for phase p.
17.        } else if a_p equals to a + 1 {
18.            mark the sender as parent-node for phase p.
19.        } else if a_p equals to a {
20.            mark the sender as sibling-node for phase p.
21.        } else {
22.            mark the sender as 'unknown' for phase p;
23.        }
```

A node only relays a flooding packet for phase p when it receives it for the first time. After processing, the node sends the modified packet to its neighbor. The process is repeated until no more relaying is necessary. That is, all nodes in the sensor field have been covered. It is assumed that there is no packet loss due to MAC layer implementation issues. If it packets are lost, then instead of broadcast, unicast is used to deliver packets, and each neighbor is required to give an acknowledgement upon receiving events.

The node reads the integer values from the packets and creates local variables in the local information database and assigns values according to the logic list. At the same time, a neighborhood relationship is established. Line 13 of the pseudo code causes the flooding process. After some processing, the node generates a new packet and transmits it to its neighbors. The packet is generated according to the data structure for originating a flooding process as described. The dynamic values of a and b is set with $a_p$ and $b_p$, the remaining contents of the generated packet are copied from the packet it has received. The classification of the neighborhood category is dependent on the information propagated. Initially, a node has no neighbor. During the flooding process, the different values of a and b in the packet are received based on the local topology information $a_p$. Next, the neighborhood relationship is established. A node will either have only one preferred parent, zero or more normal parents, zero or more children, zero or more siblings, zero or more unknown relationships.

Figure 2:
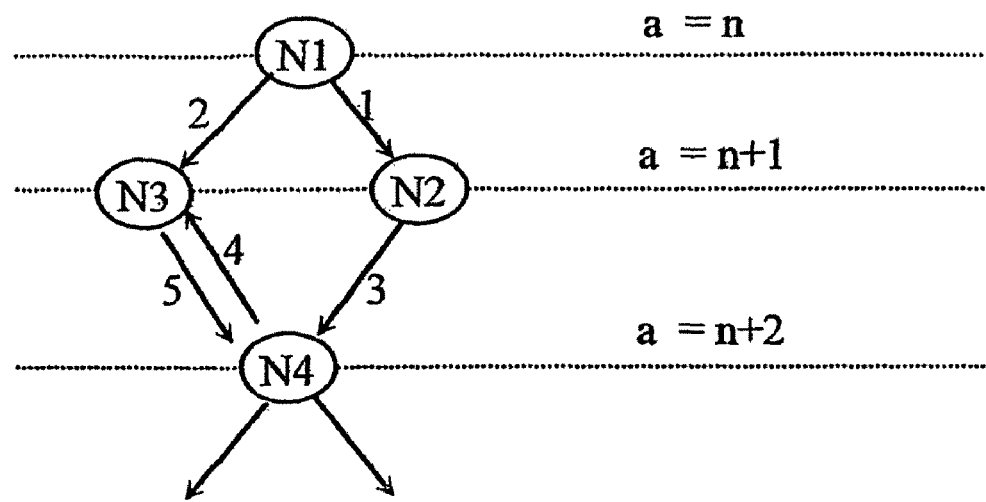
FIG. 2 is a network diagram illustrating the multiple parents of a node.

The preferred parent has some random factors because of the random sequence of the flooding packet. Referring to FIG. 2, there are four nodes: N1, N2, N3 and N4. N1 receives a flooding packet from another node with value a=n, it changes it to n+1 and is sent to N2 and N3 respectively. N2 and N3 relays the flooding packet with a changed to n+i. Since N4 is the neighbor of both N2 and N3 (that is, N4 can be reached by both N2 and N3), N4 may receive the flooding packet either from N2 or N3, first. It is random and dependent on the MAC layer synchronization mechanisms. Suppose N2 is faster than N3 at that moment, then N4 will receive the packet from N2 before it receives the packet from N3. In this case, N2 becomes the preferred parent of N4. If N3 is faster than N2, on the other hand, N3 becomes the preferred parent of N4. Thus, the preferred parent is a sometimes chosen at random.

Having multiple parents is a result of neighborhood sharing. N4; is a neighbor of both N2 and N3. Since N3 and N2 has been flooded with a packet containing a=n+1, N4 has N3 and N2 as its parents. After N4 receives the packet from N2, it relays the flooding to every one of its neighbors, including N2 and N3. When N2 receives the packet from N4, N2 marks N4 as its child according the pseudo code as described. Similarly N3 also marks N4 as a child. Therefore N4 has multiple parents.

A sibling relationship between N2 and N3 is possible when N2 and N3 are also neighbors. If N1 sends out a=n to both N2 and N3 before N2 and N3 relay any flooding packet, N2 and N3 become sibling nodes because they have the same a value.

The relationship is dependent on the phase number p. For example, N2 and N3 may be siblings in phase number 1, but N2 and N3 may share a parent-child relationship in phase number 2. It is because of the random sequence of data transmission. If N3 is kept temporary silent due to MAC layer conditions, it is possible that N2 receives a packet from N1 and sends its packet to N3, before N1 sends its packet to N3. If that happens N3 becomes the child of N2 rather than the sibling of N2.

Terminator Identification

If a flooding process is originated by one originator node and a c value (as defined by the data structure for originating a flooding process) is 1 for each sensor 20, then a special node called a terminator is identifiable. Since the c value is 1, the $a_p$ value always increases according to the pseudo code. If the flooding process is started by one originator node, then there eventually is an $a_p$ value which is the largest for that flooding process. If only one node has that value, then the node is identified as a terminator. If there are multiple nodes holding that value, one node is randomly selected to be the terminator.

To identify the terminator, each node identifies whether it is a potential candidate or not. Each potential candidate which wants to be a terminator node makes a request to the originator node. Next, the originator node confirms only one node as the terminator node. The rule to identify a potential candidate is:

1) it has no children; and
2) it has never received any flooding packets with a value larger than its $a_p$ value.

The identification must ensure that all neighboring nodes have passed the flooding process, and each neighbor has established its own $a_p$ value. The period can be marked by using a sufficiently large timeout starting from the time $a_p$ is created. The timeout value is based on the propagation delay of one-hop communication. For example, setting one-hop delay as 1 millisecond, a timeout of 900 milliseconds is sufficient to identify a node as a potential candidate for a terminator node. A false self-identification of candidate is acceptable, because the originator node can choose the largest value out of all possible candidates. The method used by each candidate to report to the originator node is achieved by finding a preferred-parent recursively. The originator node also needs a timeout value to collect all possible candidate claims. It is calculated as follows based on the maximum value of one-hop communication delay. Given the total number of nodes, nn, and the one-hop delay as 1 millisecond, the flooding process is finished by at least nn milliseconds. Each node identifies themselves as a potential candidate within nn milliseconds. Each potential candidate reports to the originator node within nn milliseconds. Thus, the maximum timeout value for the originator node to make a safe identification of the terminator is 3×nn milliseconds.

After the originator node is selected as the terminator node, it traces back to the terminator node to confirm this selection. The confirmation is also used as trigger for subsequent events, for example, a second flooding phase. Using terminator identification, a terminator is located near the boundary of the sensor field, when the scale of deployment is large enough.

Virtual Grid 10 Construction

Figure 3:
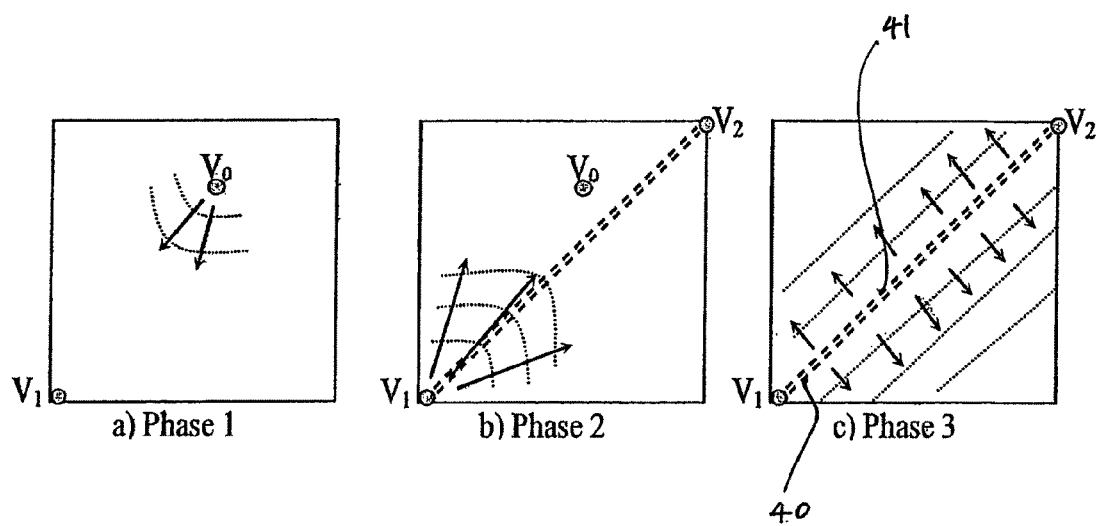
FIG. 3 is a phase diagram illustrating the various phases of virtual grid construction.

Referring to FIG. 3, the virtual grid 10 is constructed in three phases (a) to (c). Each phase performs a flooding process as described. The first phase starts from a random node $V_0$, and it identifies a terminator $V_1$. The second phase starts from $V_1$, and it identifies another terminator $V_2$. Next, $V_1$ and $V_2$ form a communication path main communication path 40 between them. The nodes which 41 belong to the main communication path 40 are generally arranged in a line joining $V_1$ and $V_2$. This line does not necessarily have to be a straight line. The third phase starts from the main communication path 40, that is, it starts from all nodes 41 that belonging to the main communication path 40. After the three phases of flooding has completed, each node 20 in the sensor field 30 is able to identify their row number and column number.

The flooding of the first phase (p=0) is originated from an arbitrary node, $V_0$. This flooding identifies a terminator, $V_1$. The flooding of the second phase originates from the terminator $V_1$. The ripples produced by the propagation forms the columns of the virtual grid 10. Technically, all nodes with the same $a_p$ value, where p=1, are classified into a single column. The column number is the value of $a_p$, where p=1. Generally, the nodes in a single column are located in geographical proximity to each other.

After flooding of the second phase is completed, the main communication path 40 between $V_1$ and $V_2$ is formed by locating a preferred parent of phase number p=1 from $V_1$ to $V_2$. This path 40 may split the sensor field 30 into two parts. FIG. 4(a) depicts a main path 40 not splitting the sensor field into two parts it may be possible that the path 40 is on the boundary of the field 30. It may also be possible that the main communication path 40 is not long enough. Leaks may split the sensor field 30 since the main communication path 40 is formed between $V_1$ and $V_2$. By including more neighboring nodes proximal to the path 40, the main communication path 40 is thickened. There are two purposes for thickening the path 40. One purpose is that if the path 40 splits the sensor field 30 into two parts, the path 40 will split it as depicted in FIG. 4(b). The other purpose is the path 40 provides a dam if flooding occurs in one half of the sensor field 30.

Row constructions are achieved by flooding from the path 40. Each ripple produced by the path 40 forms a row. Technically, nodes with the same $a_p$ value, where p=2, are classified into one row. Row construction is different from that of column construction. A node belonging to the path 40 has a value of 0 in the propagation packet. During propagation, both sides of the path 40 form a value with 1, 2, 3, etc. This behavior is not desired, since a uniform direction for the virtual grid 10 is desirable, for example, right=small-row-number→big-row-number.

Figure 5:
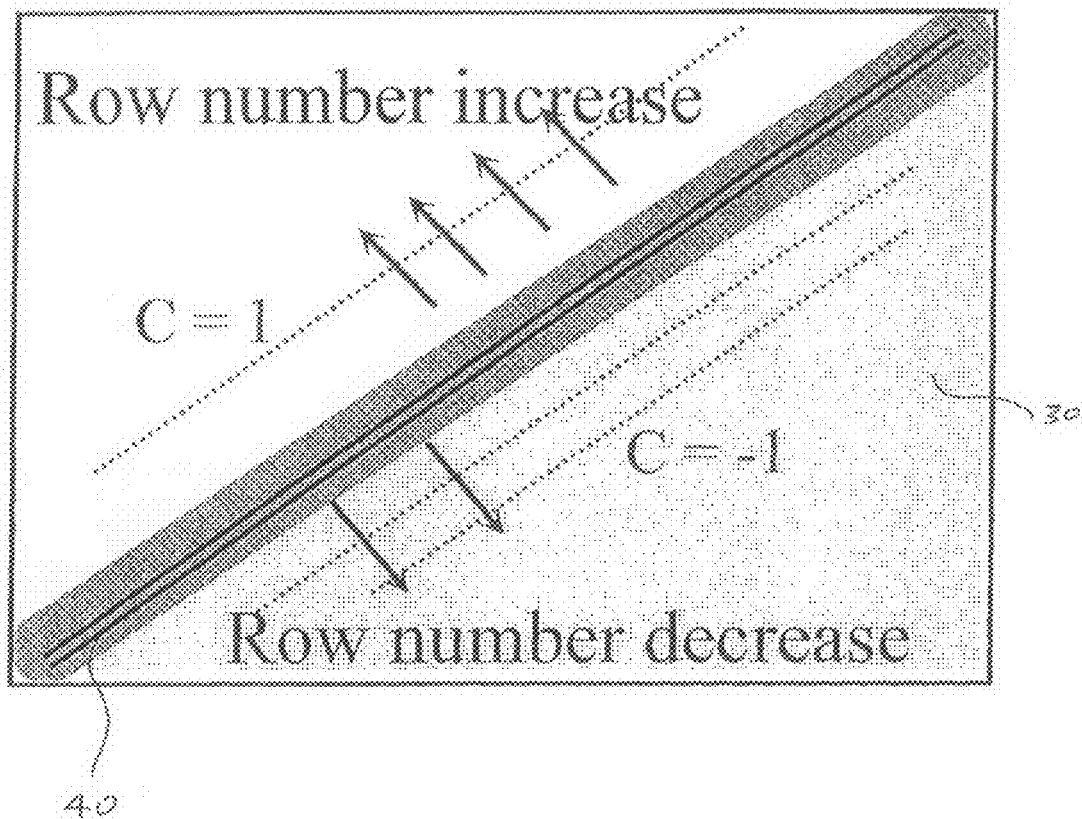
FIG. 5 is a diagram illustrating the uniform direction of a row number distribution.

Referring to FIG. 5, to achieve uniform direction, the c value is defined. Flooding one half of the region ensures that the nodes in that half are all assigned −1 to c value. It is irrelevant whether the path 40 splits the sensor field 30 into two halves because the row number is either always increasing or decreasing. Using the c value, the row number (that is, the $a_p$ value, where p=2) is 1, 2, 3, 4 for one half, and is −1, −2, −3, 4 for the other half. This numbering system ensures the row number is in a uniform direction, that is, the row number is always increasing or decreasing.

After constructing the virtual grid 10, each node 20 is identifiable by a row number and column number, that is, by virtual coordinates. Logical direction can be derived from the row number and column number. Given two nodes N1 and N2, with virtual coordinates (row1, col1) and (row2, col2) respectively, LEFT and RIGHT can be defined. Node N1 is left of N2, if and only if row1<row2. N2 is said to be at the right of N1 if and only if row1>row2. Similarly, UP and DOWN can be defined as well. Node N1 is said to be above of N2, if and only col1<col2. N2 is said to be below of N1 if and only if col1>col2.

The logical direction can be used to simplify the information transmitted in the sensor network 30. For example, instead of recording the path for each interest spread out by a sink 21, the direction of where the interest is coming from is recorded. Whenever there is a piece of data matching that interest, the data is forwarded in the opposite direction. This is one example of the usefulness and potential of the logical direction feature provided by the virtual grid 10.

Figure 6:
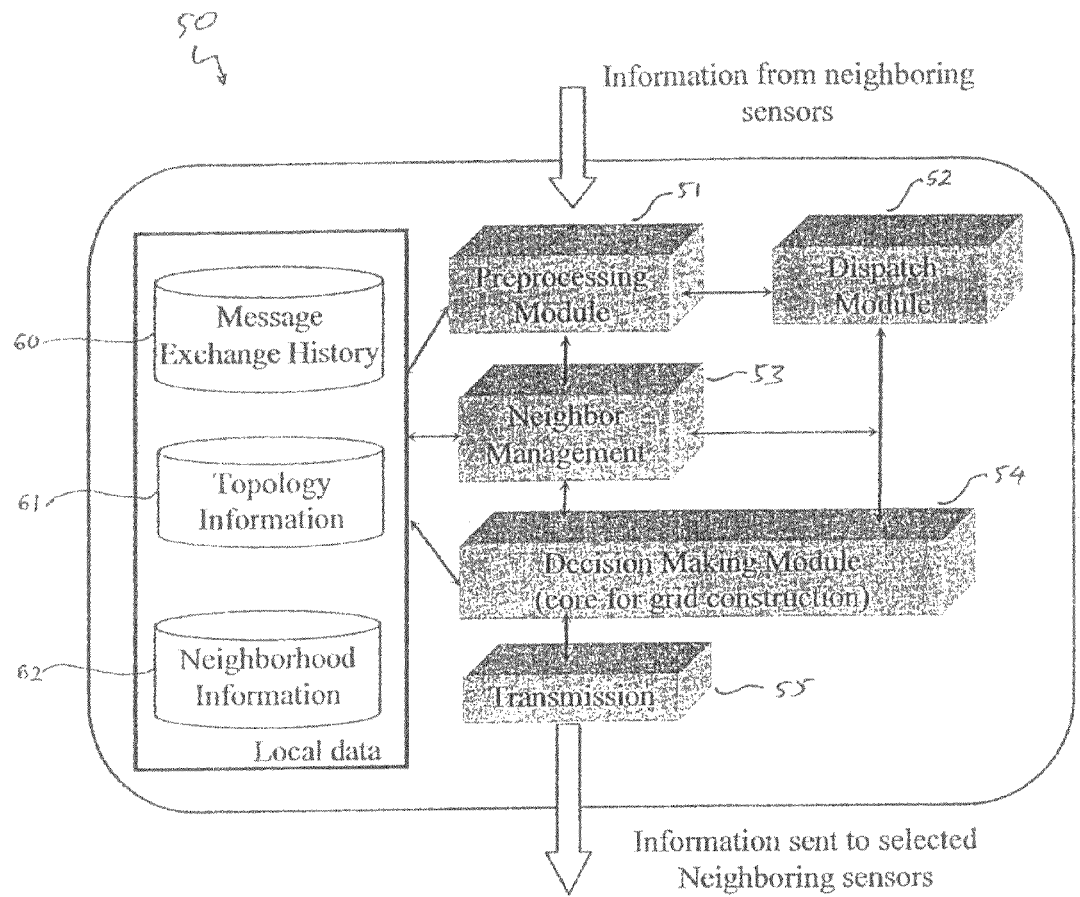
FIG. 6 is a system diagram illustrating the software modules of the system.

Referring to FIG. 6, a system 50 for constructing the virtual grid 10 comprises several software modules. The system 50 generally comprises the following software modules: preprocessing module 51, dispatch module 52, neighbor management module 53, decision making module 54 and transmission module 55. The system 50 uses the following data types for local data: packet exchange history 60, topology information 61 and neighborhood information 62. The software modules reside and run within each sensor node 20.

Incoming information is received from any neighboring sensor. Outgoing information only transmits to selected neighboring sensors. During construction of the virtual grid 10, topology knowledge 61 is accumulated by the sensor node to facilitate formation of the virtual grid 10. Each packet received is passed to the pre-processing module 51 that performs logging and checksum calculation. The packet is then passed to the dispatch module 52 which classifies packets into one of three categories: neighbor management, grid-construction, or pass-through. The decision making module 54 contains the processing logic for virtual grid 10 construction. The other modules 53, 55 provide support functions to the other modules 51, 52, 54.

Figure 7:
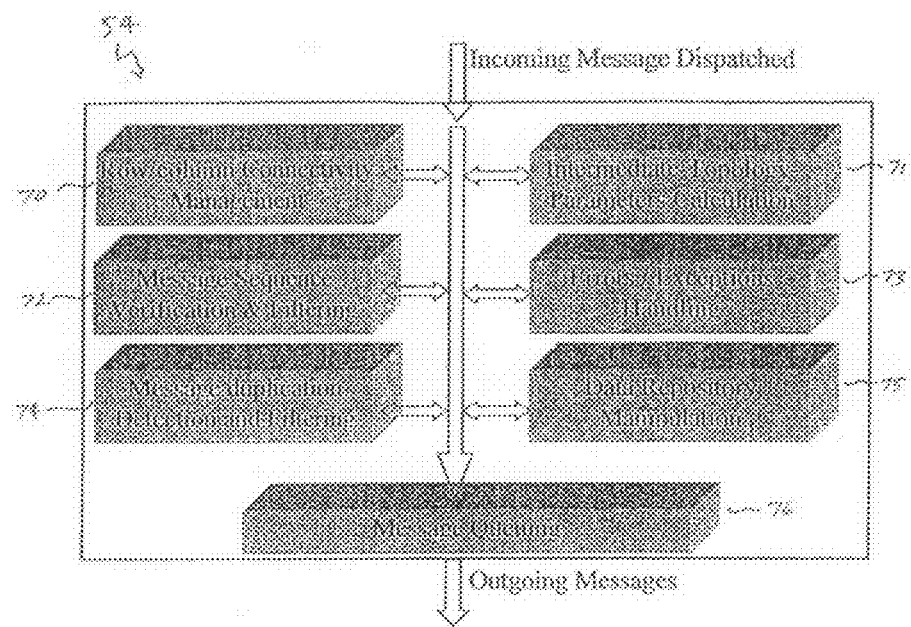
FIG. 7 is a block diagram illustrating the decision making module.

Referring to FIG. 7, the decision making module 54 performs several sub-functions 70, 71, 72, 73, 74, 75, 76. The packets which are processed by the decision making module 54 pass through at least one sub-function, packet queuing 76. Packets in the queue are then passed to the transmission module 55.

Depending on the packet type and content, a packet may also go through several other sub-functions before being queued for future transmission. The row/column connectivity management sub-function 70 detects the connectivity of the row/column that the sensor node belongs to. If the row/column connectivity is broken, a packet exchange is requested among neighbors to re-establish the connectivity. The intermediate topology parameters calculation sub-function 71 calculates the values of a, b, c, etc. The packet exchange follows a certain logical sequence as defined in the protocol. However, the sensor network 30 does not have global synchronization control. Thus, the packet sequence verification and filtering sub-function 72 is used to protect certain processes in the packet exchange. The remaining three sub-functions provide support. The error/exception handling sub-function 73 manages errors and raises a request to repeating failed operations. The packet duplication detection sub-function 74 eliminates unnecessary duplicates when receiving packets from two neighboring nodes that have the same purpose. The data repository manipulation sub-function 75 reads or writes the local data.

Jittering is used to alleviate the effects resulting from the broadcast storm problem. Jittering avoids the simultaneous transmission of data by jittering their transmission time. However, jittering cannot completely solve the broadcast storm problem and is able to alleviate the effect of packet collision and media contention. To avoid the broadcast storm problem, sequential unicast is used. Sequential unicast requires a pre virtual grid 10 construction phase, which discovers the neighbors through gossiping or rumor among sensors.

Mathematical Modeling

The sensor field 30 is modeled as a connected graph. Some topological attributes are defined based on the graph. A discovery process to determine some of the topological attributes is described.

The connected graph is denoted G=(V, E), where V is the set of sensors and E is the set of edges between sensor nodes: $E=\{(i_a, i_b)|i_a, i_b \in V, i_a \leftrightarrow i_b\}$. $i_a \leftrightarrow i_b$ represents $i_a$ and $i_b$ are within the wireless communication range of each other. If $i_a \leftrightarrow i_b$, then $i_a$ and $i_b$ are neighbors. For a node i, its neighbor is denoted as $R_i$. $R_i$ is further defined as $R_i=\{i_x|i_x \in V, (i,i_x) \in E\}$. To reflect the high density and the short communication range of sensor nodes, $1 \leq |R_i| << |V|$. In asymmetric communication, $i_a$, can reach $i_b$ while $i_b$ cannot reach $i_a$ because the wireless communication range of $i_a$ is much larger than that of $i_b$. In this embodiment, the sensor nodes are required to have the same wireless coverage range.

A virtual grid 10 provides connectivity between any pair of nodes, and thus graph G=(V, E) cannot be disconnected. For every pair of nodes $(i_x, i_y) \in V \otimes V - \{(i_x, i_x)|i_x \in V\}$, at least one sequence, the path, is found, $v_0, v_1 K v_n$ where $v_0=i_x$, $v_n=i_y$ and $(v_r, v_{r+1}) \in E$, for all $0 \leq r \leq n$.

$i_x \sim i_y$ is used to denote that every pair of nodes have at least one communication path. Mathematically, ~ is a binary relation of V. ~ is transitive because a~b and b~c can derive a~c.

Without losing generality, the sensor field 30 is assumed to be on a two-dimensional plane. Hence, a two-dimension grid is constructed. For multi-dimensional planes, the same mechanisms are applied to a multi-dimension grid.

Every node has topological attributes in the sensor network 30. Two basic attributes of a node x are row number, row(x), and column number, col(x). Both row(x) and col(x) are integers. Every node starts row and column number with −1. Grid construction determines the value of row(x) and col(x). To facilitate grid construction, a special attribute type f is defined. Attribute f is a pair of integers. Every node has n such attributes. $f_i(x)$, $1 \leq i \leq n$ to denote such attributes of node x, specifically, $\alpha_i(x)$, $\beta_i(x)$ is used to represent the pair of integers of $f_i(x)$. For a two dimension grid construction, at least three instances of such attributes are needed, that is, $f_1(x)$, $f_2(x)$, and $f_3(x)$. Every node initializes the values of $\alpha_i(x)$ and $\beta_i(x)$ to −1. The last attribute, $\theta(x)$, is also integer, which can be −1, 0 or 1. Every node initializes its $\theta$ value to 1.

$f_i(x)$ is determined by a single full scale flooding in the sensor network 30. The flooding is originated by one or more nodes with three non-negative integer parameters, that is, i, A and B. The value of i indexes which $f_i(x)$ requires determination as there may be more than one attribute: $f_1(x)$, $f_2(x)$, and $f_3(x)$. Parameters A and B are used to determine the initial value for $\alpha$ and $\beta$. If the discovery is originated by multiple nodes, then the originator nodes share the same initial parameters, that is, i, A and B. For each originator node x, the flooding is started with the following pseudo code:

```
Start Broadcast (i, A, B)
  1.  set α_i(x)= A .
  2.  set β_i(x)= B .
  3.  for all y ∈R_x , send to y : i, f_i(x), and B.
```

$$\beta_i(y) = \begin{cases} B & \text{if } \alpha_i(y) < 0, \beta_i(x) = 0 \\ \beta_i(x) - 1 & \text{if } \alpha_i(y) < 0, \beta(x) > 0 \\ \beta_i(y) & \text{if } \alpha_i(y) \geq 0 \end{cases} \quad \text{Equation (1)}$$

$$\alpha_i(y) = \begin{cases} \alpha_i(x) + 1 & \text{if } \alpha_i(y) < 0, \beta_i(x) = 0 \\ \alpha_i(x) & \text{if } \alpha_i(y) < 0, \beta(x) > 0 \\ \alpha_i(y) & \text{if } \alpha_i(y) \geq 0 \end{cases} \quad \text{Equation (2)}$$

For any node y that receives the packet containing: i, $f_i(x)$ and B, y conducts the following operation based on equations (1) and (2):

```
On_Receive_Message (i, f_i(x), B)
  1.  if α_i(y)< 0
  2.      Calculate β_i(y) based on equation (1)
  3.      Calculate α_i(y) based on equation (2)
  4.      for all z ∈R_y , send to Z : i, f_i(y), and B.
  5.      mark node x as a preferred-parent for index i
  6.  } else {
  7.      if α_i(y) equals to α_i(x)−1 {
  8.          mark x as child-node for index i.
  9.      } else if α_i(y) equals to α_i(x)+1
 10.          mark x as parent-node for index i.
 11.      } else if α_i(y) equals to α_i(x) {
 12.          mark x as sibling-node for index i.
 13.      } else {
 14.          mark x as unknown neighbor for index i
 15.      }
 16.  }
```

The order of calculating $\beta_i(y)$ and $\alpha_i(y)$ is important because their new value depends on the old value of $\alpha_i(y)$.

After y determines $f_i(y)$, it will send the parameters: i, $f_i(y)$, and B to all its neighbor nodes. The neighbor nodes repeat the process of On_Receive_Message (i, $f_i(y)$, B) to their neighbor nodes.

The parent-children and sibling-sibling relationships are also defined using the process of On_Receive_Message (i, $f_i(x)$, B). These relationships are based on a given index i. A pair of nodes may have a different relationship for a different index i. There is only one preferred-parent for any node x from which the node receives the first discovery packet for the entire discovery process. However, it is possible to have multiple parent nodes.

With any given index i, if the discovery is performed by one originator node, some characteristics are derived:

1) During the discovery process, any node may receive multiple packets if it has multiple neighbors. However, only the first packet will result in changing its $\alpha$ value.
2) When parameter B is 1, all $\beta$ values will be 1 after the discovery process has completed.
3) All $\alpha$ values will be equal or greater than A, because $\alpha$ values never decrease.
4) When B=1, given any node x except the originator node, x has at least one neighbor y where $\alpha_i(x)-1=\alpha_i(y)$, because x has at least one preferred-parent, that is, y.
5) For the same reason, when B>1, given any node x except the originator node, there is at least one neighbor y that satisfies either $\alpha_i(x)-1=\alpha_i(y)$ and $\beta_i(y)=B$ or $\alpha_i(x)=\alpha_i(y)$ and $\beta_i(x)-1=\beta_i(y)$.
6) There is at least one node with its $\alpha$ value no less than that of every neighbor because there is a maximum $\alpha$ value for the entire sensor field 30.

Any node can find a path to the originator node of the discovery process by continuously locating one neighboring node satisfying characteristics (4) or (5).

Accordingly, $\alpha$ value decreases. Considering characteristic (3), the $\alpha$ value is decreased to A eventually. Thus every node is able to find a path to the originator node. If each node satisfies characteristic (6) and reports to the originator node its $\alpha$ value, the originator node then knows the maximum $\alpha$ value. If reporting is done as soon as the nodes clarify their neighboring $\alpha$ value, the originator node is able to determine the maximum $\alpha$ value for index i by collecting the reports within a predetermined time period. Typically, the time period does not exceed $3 \times t_{hop} \times |V|$, where $t_{hop}$ is the maximum time cost for one-hop communication. It is possible that multiple nodes may have the maximum $\alpha$ value, and the originator node may arbitrarily select one of them as a terminator. The terminator can be informed by tracing back through the reporting path.

For a pair of nodes x and y, flooding is the fastest way to deliver one packet from x to y. Since the α value only changes when it receives the first packet in the flooding process, the α value of a node approximately represents the shortest path distance from itself to the originator node of the flooding.

Figure 8:
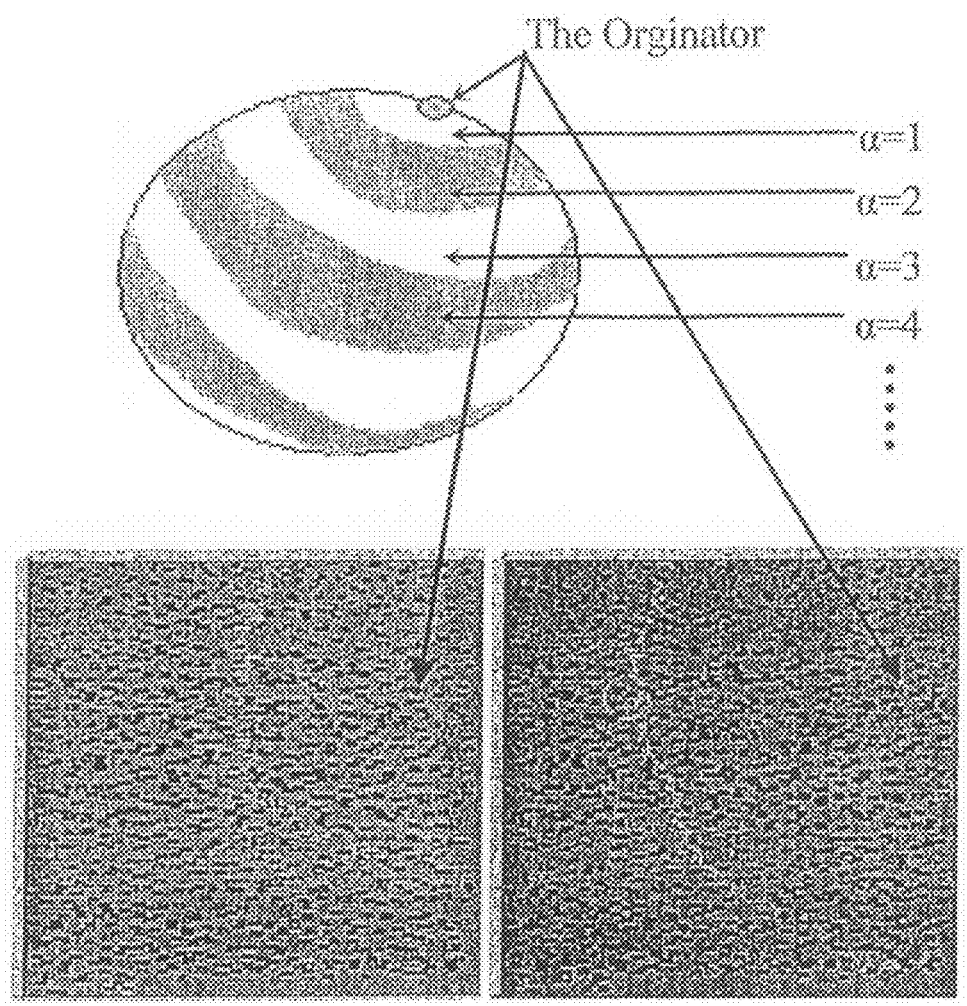
FIG. 8 is a schematic diagram illustrating the hop count increase in the sensor field.

Referring to FIG. 8, the α value represents the hop count from the originator node. The β value controls the α value. Thus, the terminator is the one of the most distal nodes from the originator node.

With regard to a given index i, the sensor nodes form sub-graphs based on a value for that index i. Given an integer value k, the sub-graph is $G_k=(V_k,E_k)$ where $V_k=\{v|α_i(v)=k, v\epsilon V\}, E_k=\{(v_i,v_j)|v_i,v_j\epsilon V_k,(v_i,v_j)\epsilon E\}$. For all $G_k\neq$null, $G_k$ may not be a connected graph.

Connectivity between two nodes is represented as a transitive-binary-relation ~. The transitive closure on ~splits $G_k$ into smaller graphs which are addressed as segments. Each segment forms a connected graph. For each segment, connectivity is achieved solely by multi-hop forwarding to sibling node.

It is simple to concatenate segments of $G_k$. First, an election is launched in each segment, one representative is elected. Between every two representative nodes, publish/subscribe mechanisms proposed by directed diffusion are used to establish a communication path, which bridges the two segments. After all bridges are constructed, segments of $G_k$ are connected by them, and thus broadcasting within $G_k$ can be achieved by multi-hop forwarding to sibling node with the help of bridges. To construct the bridges, each segment reports to a central point such as $V_0$, and $V_0$ to build a communication path between the segments. The connectivity between segments is made.

The $f_i(x)$ discovery process is used as building block for grid construction. To construct a two-dimension grid, three instances of $f_i(x)$, that is, $f_0(x)$, $f_1(x)$, and $f_2(x)$ are required.

An arbitrary node is selected and denoted as $v_0$ in the sensor field. $v_0$ originates the discovery process of $f_0(x)$. The parameters are i=1, A=0, B=1. A node $v_1$ is identified as a terminator for $f_0(x)$. Then $v_1$ is used to originate the discovery process of $f_1(x)$. The parameters are i=2, A=0, B=1. In turn, a node $v_2$ is identified as a terminator for $f_1(x)$. A group of nodes is selected based on $v_1$ and $v_2$ to form a main communication path 40. The main communication path 40 may partition the sensor field 30 into two parts. The θ value is updated during a possible partition. Finally, the discovery process of $f_2(x)$ is originated by the main communication path 40. The values of $θ_x$, $f_0(x)$, $f_1(x)$, and $f_2(x)$ determine row(x) and col(x).

$v_1$ is the originator node and $v_2$ is the terminator for the discovery process of $f_1(x)$. A terminator has no children and thus the packets passed down from its parents are not transmitted any further. Thus the terminator is always located near the boundary of the sensor field. $v_2$ is able to construct a multi-hop path to $v_1$ by locating an arbitrary parent node in the context of $f_2(x)$. This path is called the main path 40. During the main path formation, every node on the main path 40 set its θ-value=0.

Referring to FIG. 4(b), since both $v_2$ and $v_3$ are boundary nodes, the sensor field may be topologically partitioned into two parts. Alternatively, referring to FIG. 4(a), the sensor field may not be partitioned.

Figure 9:
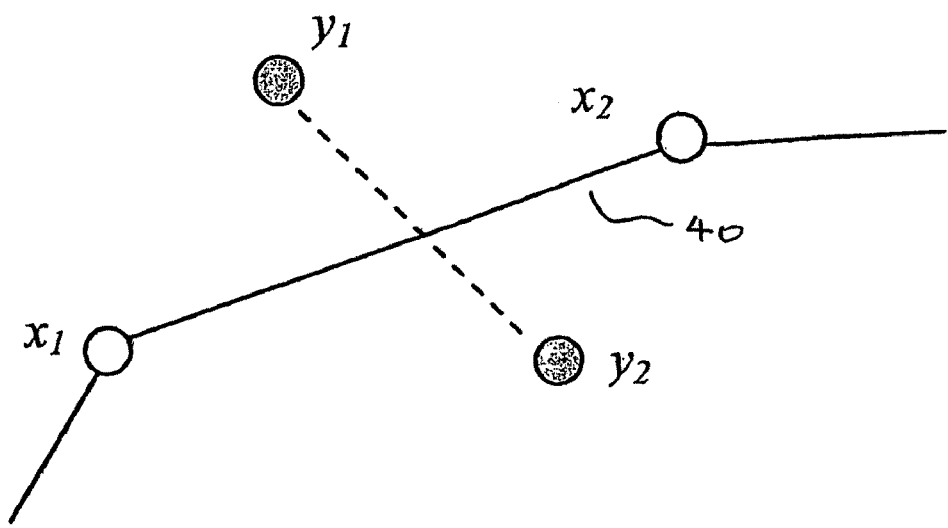
FIG. 9 is a schematic diagram illustrating communication between different partitions.

Referring to FIG. 9, a topological partition does not necessarily imply a communication partition. A pair of nodes $y_1, y_2$ are separated by the main path 40. However, they are still able to communicate with each other.

The main path 40 is a sub-graph of G, denoted as $G'=(V', E')$, where $V'=|v|$ there is a path $x_i, x_2 K x_n$ where $θ(x_1)=0$ and $0\leq n\leq 3\}, E'=\{(v_1,v_j)|v_i,v_j\epsilon V'$ and $(v_i,v_j)\epsilon E\}$.

The thickness of the main path 40 is increased by including more neighboring nodes. By adjusting the upper boundary of n, the thickness of the main communication path 40 is also adjusted accordingly.

The main communication path 40 ensures topological partition implies communication partition. A flooding process penetrating the main communication path 40 requires more than one hop within the main communication path 40. If every node in the main communication path 40 does not forward the packet from another node in the main communication path 40, the flooding is prevented from penetrating the main communication path 40. Thus, topological partition implies communication partition.

$v_0$ is the originator node of the $f_0(x)$ discovery. $v_0$ may or may not belong to the main communication path 40. If $v_0$ belongs to the main communication path 40, $v_0$ can find another node that does not belong to the main communication path 40 by locating an arbitrary child with regard to $f_0(x)$. Thus, a node may not belong to the main communication path 40 in both cases. An extreme situation is that the main communication path 40 is the entire sensor field. In this case, the virtual grid 10 is transformed into a single row. If a node that does not belong to the main communication path 40 starts flooding, every node in the main communication path 40 will not forward the flooding packet. Thus, if the sensor field 30 is divided into two parts, the flooding occurs only within one part. The flooding updates θ-value to −1 for every node that is flooded. If the sensor field 30 is partitioned, all nodes in one part has θ-value=−1, while the other part has θ-value=1. If the sensor field 30 is not partitioned, all nodes except the main communication path 40 have their θ-value=−1.

Construction of the main communication path 40 is performed by $v_2$. As soon as $v_1$ identifies $v_2$ as the terminator, it will trace back from $v_1$ to $v_2$ in order to inform $v_2$ that $v_2$ is the terminator for. $f_1(x)$ At the same time, the θ-value of every node on the main path 40 is updated to 0. After the propagation reaches $v_2$, every node belonging to the main path 40 has its θ-value updated as 0. $v_2$ triggers the main communication path 40 construction by propagating the trigger packet along the same path 40 but from $v_2$ to $v_1$. The trigger packet instructs every node on the main path 40 to send a packet to their neighbors. The trigger packet contains an instruction to make every node on the main path start the $f_2(x)$ at the approximately same time.

Row construction is performed at the same time as the discovery process of $f_i(x)$. All nodes in the main communication path 40 originate the flooding process with parameters i=3, A=0. B=1. In a preferred embodiment, the nodes in the main communication path 40 start flooding at the same time. It is not important which node begins the flooding. However, it is important that the nodes start the flooding as soon as possible. During flooding, the α-value decreases in the part where all nodes have θ=−1 whereas the α-value increases in the part where all nodes have θ=1.

Figure 4:
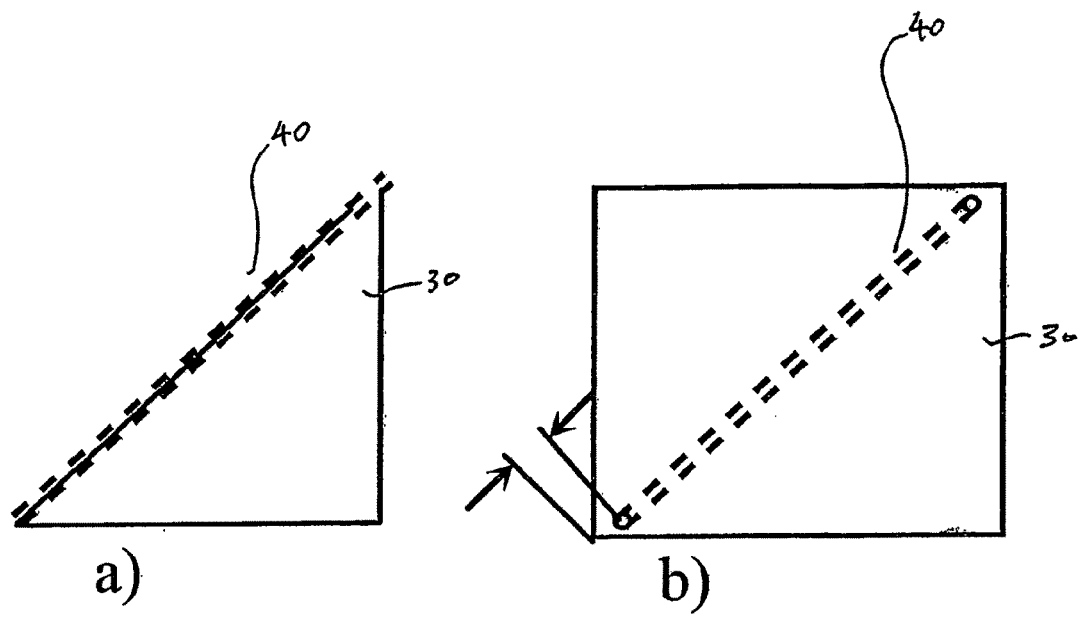
FIG. 4 is a diagram illustrating the sensor field not being split into two parts.

Referring to FIG. 4, the α-value propagation has an overall direction,

After $f_2(x)$ is discovered, every node is able to identify their row number row(x)=$α_2(x)$. Column construction is based on the discovery result of $f_1(x)$ col(x)=$α_1(x)$.

The direction of up, down, left, right is determined after row(x) and col(x) are available. For a pair of nodes x and y, x is left to if and only if col(x)<col(y). x is below y if and only if row(x)>row(y). The nodes having the same row number and column number have no relative direction because a row and column consists of multiple nodes. The direction is logical rather than geographical. By continuously finding a left node, it is possible to move geographically to the right.

The rows and columns are formed with robustness in mind. Robustness of the virtual grid 10 increases when rows and columns grow thicker. In other words, if one node in the row suddenly dies, the entire virtual grid 10 does not fall apart because other nodes are supporting the connectivity of that row. The parameter B for originating the $f_r(x)$ discovery controls the thicknesses of the rows and columns. A larger B value results in a more equivalent $\alpha$-value, and thus it results in thicker rows and columns. The main communication path 40 is not controlled by B. However, the main communication path 40 can be arbitrarily adjusted by including more neighboring nodes of main path 40.

A number of characteristics have been achieved:
1) The logical relationship of up, down, left and right are transitive. If x is left to y, and y is left to z, y is left to z. It is determined from the row(x) definition.
2) Nodes within the same row can communicate with each other by multi-hop sibling-sibling communication or by using bridges.
3) Nodes within the same column can communicate with each other by multi-hop sibling-sibling communication or by using bridges.
4) The hop count is observed. In other words, for two nodes, x, y, their distance in the virtual grid 10, $\sqrt{[row(x)-row(y)]^2+[col(x)-col(y)]^2}$ increases when their hop count increases.

Energy consumption for constructing the virtual grid 10 is independent of any application. Energy consumption has an upper bound, which is proportional to the total number of sensor nodes. By providing logical direction, a routing decision is made based on the sensor nodes, and thus it enables significant optimization for routing in sensor networks in comparison to a non-directed sensor field. The construction of the virtual grid 10 does not rely on any global information, application specific information, and any geographical coordinates. The decision is purely based only on local information, that is, the node or its neighbors. After constructing the virtual grid 10, each node stores global knowledge information via the attributes. For example, row number and maximum row number.

The virtual grid 10 is constructed solely based on neighborhood relationships. The virtual grid 10 does not require any geographical information, and it does not require the sensor to provide any application specific information. Different modules and detailed propagation process including key data structure used is presented. The virtual grid 10 is constructed without using any location information and any application specific information. The logical direction is defined, and enables significant optimization for routing decision in sensor networks. It does not assume special arrangement during the deployment, and the proposed virtual grid 10 can be applied and exploited for sensor networks and sensor applications.

The virtual grid 10 provides energy efficient and a robust structure. The virtual grid 10 can be applied in wireless ad hoc networks since it provides a self-organization mechanism for the nodes in these networks.

Although the primary application for a virtual grid 10 is for wireless sensor networks, it is envisaged that the virtual grid 10 may be used for general purpose sensor network applications including tracking and surveillance.

Although a grid formation has been described, the virtual grid may also be transformed to other structures such as trees and clusters. Applications preferring these structures also enjoy the advantages of the present invention.

It is envisaged that various data dissemination schemes are possible. The sample scheme may also be optimized further by existing optimization techniques.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for constructing a virtual grid for routing data via wireless sensor nodes of a sensor field, the method comprising:
    flooding the sensor field to identify a first terminator, the flooding originating from a first node;
    flooding the sensor field to identify a second terminator, the flooding originating from the first terminator; and
    forming a main communication path by selecting nodes between the first and second terminators;
    wherein the virtual grid is constructed by flooding the sensor field such that each node in the sensor field is assigned a row identifier relative to the main communication path, the flooding originating from the nodes belonging to the main communication path; and wherein each node is assigned a column identifier according to its hop count from the first terminator.

2. The method according to claim 1, wherein the first node is selected by a user.

3. The method according to claim 1, wherein the columns of the virtual grid are constructed when identifying the second terminator.

4. The method according to claim 1, wherein a relationship between a node and a neighboring node is classified according to the order in which they receive a broadcast message of the flooding.

5. The method according to claim 4, wherein the relationship is classified according to any one in the group consisting of: only one preferred parent, normal parents, children, sibling, and unknown.

6. The method according to claim 1, wherein a flooding packet is transmitted to the nodes during flooding.

7. The method according to claim 6, wherein the flooding packet has a data structure comprising variables to store information relating to: phase number, thickness control of the rows and columns, hop count from the originating node, granularity of each row or column and total number of nodes in the sensor field.

8. The method according to claim 1, wherein the topology of the sensor field is stored in a local topology database of each node.

9. The method according to claim 1, wherein the first terminator is a node having the largest hop count from the first node after flooding by the first node and is a node without any children.

10. The method according to claim 1, wherein the second terminator is a node having the largest hop count from the first terminator after flooding by the first terminator and is a node without any children.

11. The method according to claim 1, further comprising thickening the main communication path by increasing the number of neighboring nodes proximal to the main communication path.

12. The method according to claim 1, wherein the flooding is restricted to a portion of the total number of nodes of the sensor field.

13. The method according to claim 1, wherein communication between a source and a sink via the virtual grid is routed according to logical directions.

14. The method according to claim 1, wherein the first node belongs to the main communication path.

15. The method according to claim 1, wherein all nodes of the sensor field belong to the main communication path.

16. The method according to claim 1, wherein each node has the same range of wireless coverage.

17. The method according to claim 1, wherein each node asymmetrically communicates with another node.

18. The method according to claim 1, wherein the sensor field is on a two dimensional plane or a multi-dimensional plane.

19. The method according to claim 1, wherein the main communication path is substantially a straight line from the first terminator to the second terminator.

20. A virtual grid constructed by the method according to claim 1.

* * * * *